(12) United States Patent
Söllner et al.

(10) Patent No.: US 9,908,650 B2
(45) Date of Patent: Mar. 6, 2018

(54) METHOD AND DEVICE FOR PRODUCING CONTAINERS

(71) Applicant: Krones AG, Neutraubling (DE)

(72) Inventors: Jürgen Söllner, Neutraubling (DE); Holger Müller, Neutraubling (DE)

(73) Assignee: Krones AG, Neutraubling (DE)

( * ) Notice: Subject to any disclaimer, the term of this patent is extended or adjusted under 35 U.S.C. 154(b) by 434 days.

(21) Appl. No.: 14/425,638

(22) PCT Filed: Sep. 6, 2013

(86) PCT No.: PCT/EP2013/068481
§ 371 (c)(1),
(2) Date: Mar. 4, 2015

(87) PCT Pub. No.: WO2014/037510
PCT Pub. Date: Mar. 13, 2014

(65) Prior Publication Data
US 2015/0225098 A1    Aug. 13, 2015

(30) Foreign Application Priority Data
Sep. 7, 2012   (DE) .................. 10 2012 108 329

(51) Int. Cl.
*B65B 55/10*    (2006.01)
*B65B 3/02*     (2006.01)
(Continued)

(52) U.S. Cl.
CPC .......... *B65B 31/025* (2013.01); *B29C 49/64* (2013.01); *B65B 3/02* (2013.01); *B65B 3/04* (2013.01);
(Continued)

(58) Field of Classification Search
CPC ......... B29C 49/06; B29C 49/12; B29C 49/66; B29C 2049/4697; B29C 49/64; B65B 55/10; B65B 3/02; B65B 3/04
See application file for complete search history.

(56) References Cited

U.S. PATENT DOCUMENTS 4,883,631 A * 11/1989 Ajmera ............... B29C 49/6472
                                                     264/237
5,213,725 A *  5/1993 Lee ..................... B29C 47/0026
                                                      264/28
(Continued)

FOREIGN PATENT DOCUMENTS

DE    10 2006 053 193 A1    5/2008
DE    10 2008 008 528 A1    8/2009
(Continued)

OTHER PUBLICATIONS

International Search Report in PCT/EP/2013/068481, dated Oct. 15, 2013.
(Continued)

*Primary Examiner* — Andrew M Tecco
*Assistant Examiner* — Praachi M Pathak
(74) *Attorney, Agent, or Firm* — Oppedahl Patent Law Firm LLC

(57) ABSTRACT

A method for producing containers (10) filled with liquid, more particularly drinks containers, wherein plastic preforms are shaped into plastic containers (10) by means of a shaping device (2), these plastic containers are transported to a filling device (4) and are filled with a liquid by means of this filling device, wherein, on their transport path between the shaping device (2) and the filling device (4) the containers (10) are cooled, at least partly, by being charged with a liquid medium. According to the invention the containers are transported, at least during filling, within a clean room (Continued)

(20) which is delimited from an environment by means of a sealing device (62).

18 Claims, 2 Drawing Sheets

(51) Int. Cl.
| | |
|---|---|
| B65B 3/04 | (2006.01) |
| B29C 49/64 | (2006.01) |
| B65B 31/02 | (2006.01) |
| B65B 43/52 | (2006.01) |
| B29C 49/06 | (2006.01) |
| B29C 49/12 | (2006.01) |
| B29C 49/36 | (2006.01) |
| B29C 49/46 | (2006.01) |
| B67C 3/22 | (2006.01) |

(52) U.S. Cl.
 CPC .............. *B65B 43/52* (2013.01); *B65B 55/10* (2013.01); *B29C 49/06* (2013.01); *B29C 49/12* (2013.01); *B29C 49/36* (2013.01); *B29C 2049/4697* (2013.01); *B67C 2003/227* (2013.01); *B67C 2003/228* (2013.01)

(56) References Cited

U.S. PATENT DOCUMENTS

| | | | | |
|---|---|---|---|---|
| 5,851,478 | A * | 12/1998 | Iizuka | B29C 49/6481 264/520 |
| 6,143,234 | A * | 11/2000 | Van Horn | B29C 49/66 264/528 |
| 6,168,414 | B1 * | 1/2001 | Oas | B29C 49/58 264/28 |
| 6,485,670 | B1 * | 11/2002 | Boyd | B29C 49/46 264/521 |
| 6,514,451 | B1 * | 2/2003 | Boyd | B29C 49/4823 264/521 |
| 7,832,185 | B2 * | 11/2010 | Mastio | A61L 2/082 250/492.3 |
| 8,453,419 | B2 * | 6/2013 | Roithmeier | B29C 49/42 53/111 R |
| 8,459,315 | B2 * | 6/2013 | Clusserath | B67C 3/004 141/145 |
| 2002/0048642 | A1 * | 4/2002 | Beck | B29C 49/46 428/35.7 |
| 2005/0188651 | A1 * | 9/2005 | Clusserath | B67C 7/0073 53/136.1 |
| 2005/0188654 | A1 * | 9/2005 | Clusserath | B67C 3/281 53/415 |
| 2010/0095639 | A1 * | 4/2010 | Hohenhorst | B65D 23/0807 53/452 |
| 2010/0162662 | A1 * | 7/2010 | Iwashita | B65B 55/10 53/426 |
| 2010/0199604 | A1 * | 8/2010 | Fischer | B67C 7/0073 53/425 |
| 2010/0324723 | A1 * | 12/2010 | Zech | B29C 49/42 700/223 |
| 2011/0133369 | A1 | 6/2011 | Martini et al. | |
| 2012/0070522 | A1 * | 3/2012 | Voth | B65B 55/08 425/88 |
| 2013/0126040 | A1 * | 5/2013 | Clusserath | B67C 3/02 141/65 |
| 2013/0326998 | A1 * | 12/2013 | Hartwig | B29B 11/14 53/453 |

FOREIGN PATENT DOCUMENTS

| | | |
|---|---|---|
| EP | 2388129 A | 11/2011 |
| EP | 2653396 A1 | 10/2013 |
| JP | H09110094 A | 4/1997 |
| JP | 2011255952 A | 12/2011 |
| JP | 2012500134 A | 1/2012 |
| WO | 9847770 A1 | 10/1998 |

OTHER PUBLICATIONS

China Patent Office First Action in related case 518040 dated Feb. 3, 2016.
English translation of the above.
Japanese office action in application 2015-530413 dated Jun. 8, 2017.
English translation of Japanese office action in application 2015-530413 dated Jun. 8, 2017.
Russian office action in application 2015106334/02(010281) dated Aug. 21, 2017.
English translation of Russian office action in application 2015106334/02(010281) dated Aug. 21, 2017.

* cited by examiner

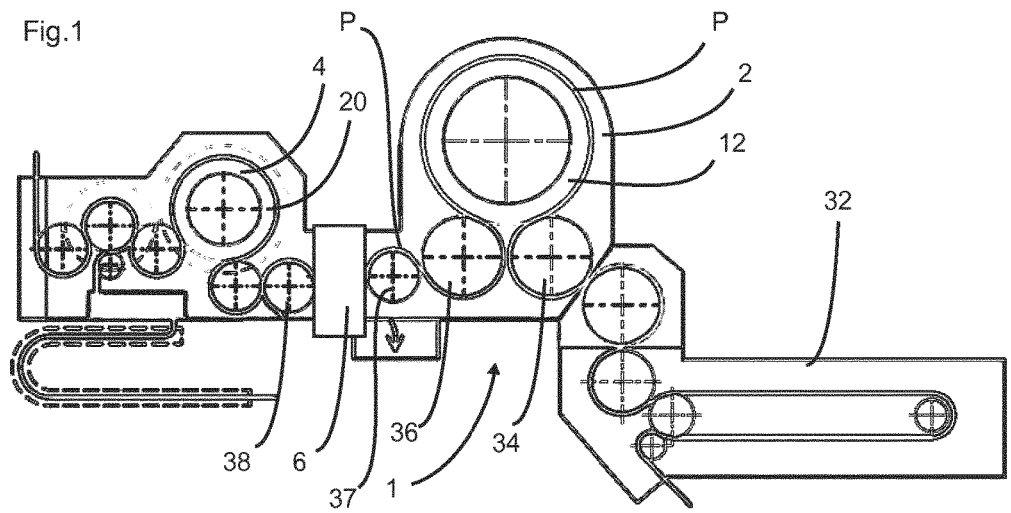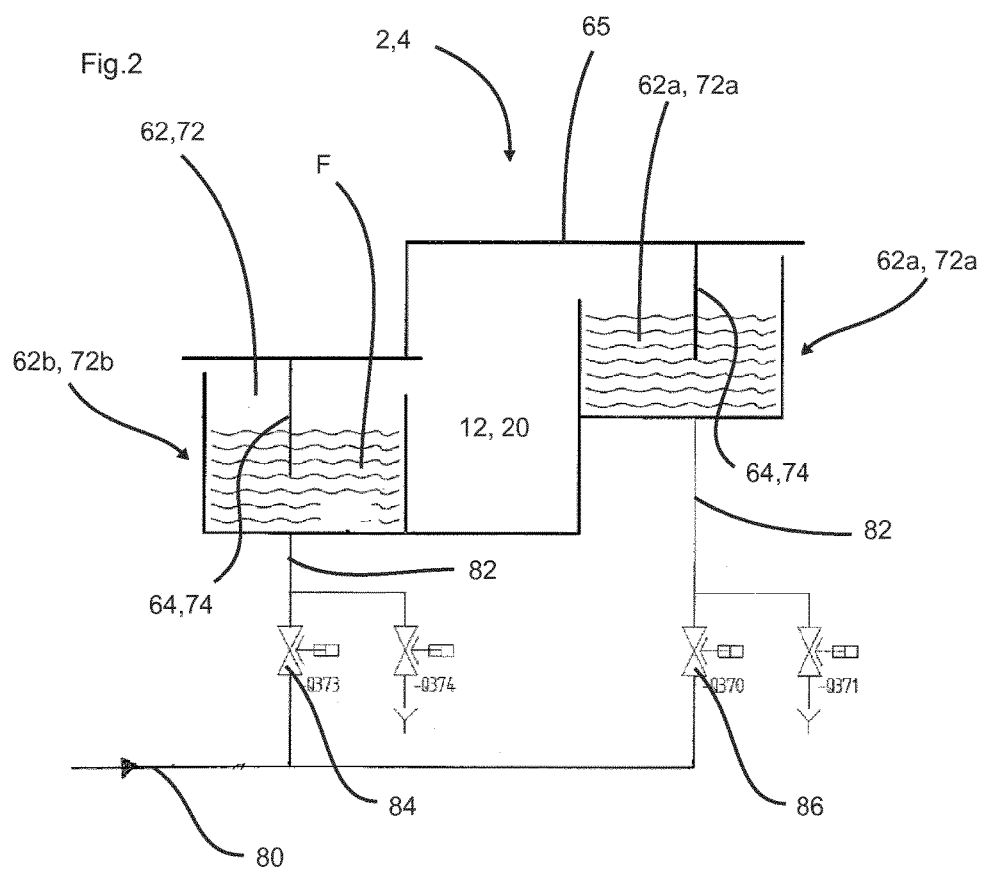

METHOD AND DEVICE FOR PRODUCING CONTAINERS

The present invention relates to an apparatus and a method of producing beverage containers. In this case it is known from the prior art for plastics material containers first to be produced from plastics material pre-forms and for these containers then to be filled with a liquid, such as a beverage. In this case it is also known that when beverage containers are filled with certain sensitive products it is necessary that the containers to be filled should be sterile.

In particular, in order to fill $CO_2$-containing beverages it is necessary in this case that the container to be filled should be pre-stressed at a defined pressure. PET containers are heated during the production to a plasticization temperature in order to be able to shape them in a suitable manner. After the blow moulding procedure or stretch blow moulding procedure respectively of the PET container the base of these containers is still hot. If this newly produced container is then acted upon with pressure in a filler immediately after the production process, the base will be deformed in some cases and the bottle or the container respectively can be destroyed in this case.

Methods are known from the prior art in which the containers are stored or conveyed for a relatively long time in environmental air, so that the base area cools. It is also known to inject the container base with a cold liquid in order to shorten the cooling time accordingly. In the case of plants of this type, in which a blow moulding machine is in a block directly with the filling device, the transfer time in which the containers are conveyed from the production arrangement to the filling device is not sufficient in some cases to cool the base of the containers without a wet cooling of the base to the extent that the containers are not deformed or damaged during the pre-stressing in the filling device.

A method and an apparatus for the combined production and filling of containers of plastics materials are known from DE 10 2008 026 043 A1. In this case the container is cooled during a transfer by the application of a spray mist. In addition, DE 10 2004 023 419 A1 describes a method and an apparatus for cooling newly blow moulded plastics material containers.

DE 20 2007 008 120 U1 describes an apparatus for the production and cooling of hollow bodies of plastics material. In this case a tube, which conveys a cooling fluid, is provided below a base of the containers.

The object of the present invention is therefore to make available a method and an apparatus which can also, and in particular, be used for containers containing $CO_2$-containing beverages or in general for containers of this type, and in particular plastics material containers, which are acted upon with a pressure during the filling procedure thereof. This object is attained according to the invention by the subjects of the independent claims. Advantageous embodiments and further developments form the subject matter of the sub-claims.

In the case of a method according to the invention for the production of containers filled with liquid, and in particular beverage containers, plastics material pre-forms are shaped to form plastics material containers by means of a shaping device and, after that, these plastics material containers are conveyed to a filling device and are filled with a liquid by means of this filling device. In this case the containers are cooled on their conveying path between the shaping device and the filling device at least locally by being acted upon with a liquid medium.

According to the invention the containers are conveyed at least during the filling inside a clean room which is bounded off from a non-sterile environment by means of a sealing device.

In contrast to the prior art it is therefore proposed that at least the filling of the containers is carried out under sterile conditions. This is unusual inasmuch as, although plants which permit the sterile filling of beverages are known from the prior art, however, the containers are not acted upon with a liquid medium in this case since this would run contrary to the sterile filling.

It is advantageous for the containers to be acted upon with the liquid medium on their outer wall. It is advantageous, in particular, for a base area of the containers to be acted upon with the liquid medium in order to cool it. The base area is understood in this case as being, in particular, a lower quarter—of a container standing upright—of the container including the actual base portion.

It is advantageous for the containers to be acted upon with a pre-set internal pressure before or during their filling.

In the case of a further advantageous method the containers are acted upon with a sterile liquid medium in order to cool them. As a result of the use of this sterile medium the sterility of the containers, in particular, can be maintained. It is advantageous for sterile water to be used for the cooling. It is advantageous for at least the base areas of the containers to be acted upon at least in sections and preferably completely with the cooling medium.

In the case of a further advantageous method the containers are also conveyed inside a clean room during their shaping procedure in the shaping device. It is advantageous for this too again to be a clean room which is bounded off from an environment (in particular non-sterile) by means of a sealing device. It would also be possible, however, for the containers to be produced in a non-sterile manner and then for a sterilization procedure to be carried out.

It is advantageous for the shaping device to be a blow moulding machine, and in particular a stretch blow moulding machine, by which the plastics material pre-forms are also stretched by means of a stretch rod.

In the case of a further advantageous embodiment at least one clean room is sealed off by the use of a liquid conveyed in a continuous duct. It is advantageous in this case for part of this liquid to be used in order to cool the plastics material containers. It would also, however, be possible for a central supply line to be provided which supplies both the aforesaid ducts and the cooling device for cooling the plastics material containers. It is advantageous for the liquid which is used to seal off at least one clean room and for the cooling liquid for the containers to originate from the same source and it is preferable for a flow connection to be present at least for a time between the sealing device for sealing off at least one clean room and the cooling device.

In the case of a further advantageous embodiment stressing devices, for example nozzles, are provided which apply the liquid medium to the base area of the containers.

In the case of a further advantageous method the liquid used for cooling the containers is conveyed in a (liquid) circuit. In this way, it is possible for example for the stressing devices mentioned above to act upon the base area of the containers with the cooling liquid and for the latter subsequently to drip off into a collecting container for example and to be capable of being returned.

In the case of a further advantageous method the liquid used for cooling the containers is itself cooled. In this way for example, a cooling unit which cools the liquid can be provided in the circuit mentioned above. This cooling unit can be for example Peltier elements, but also a heat exchanger.

In the case of a further advantageous embodiment the liquid to be filled into the containers is a $CO_2$-containing beverage. The method proposed in this case is particularly advantageous for beverages of this type since the filling of beverages of this type usually requires that the containers should be under pressure.

The present invention further relates to an apparatus for the production of containers filled with liquid, and in particular beverage containers. This apparatus has a shaping device which shapes plastics material pre-forms into plastics material containers by acting upon them with a gaseous medium. In addition, the apparatus has a filling device which is arranged in a conveying direction of the plastics material pre-forms downstream with respect to the shaping device and which fills the plastics material containers with a liquid. In addition, the apparatus has a cooling device which is arranged between the shaping device and the filling device and which acts upon the plastics material containers with a liquid medium at least in sections in order to cool them.

According to the invention at least the filling device has a clean room, inside which the containers are capable of being conveyed during the filling thereof and which is bounded off from an environment by means of at least one sealing device.

It is therefore also proposed with respect to the apparatus that a cooling, in particular of the base areas of the containers, should be carried out and, after that, a sterile filling. Such cooling means of the base in aseptic plants are not yet known in the prior art. As mentioned above, this would be based upon the fact that the stressing of the containers per se would run counter to the sterility. In the case of aseptic plants of this type, in which the containers are sterilized upstream of a blow moulding machine or even immediately downstream thereof, the base of the newly produced container would then have to be cooled with a medium which is sterile. Otherwise the container would be re-contaminated again by the cooling of the base.

It is advantageous for the apparatus to be an apparatus in a block, which means in particular that the filling device and the shaping device are synchronized with each other. In plants of this type in a block, however, the cooling of the container in the environment (in particular using a long transfer time) can be extremely uneconomic.

It is advantageous for the apparatus to have a conveying device which conveys the containers from the shaping device to the filling device. It is advantageous for this conveying device to have a plurality of holding devices for holding the containers while they are conveyed. It is advantageous for these holding devices to hold the containers in an aperture area thereof, for example below the carrying ring thereof.

It is therefore proposed, as mentioned above, for the newly produced container to be acted upon with a sterile medium, and in particular to be acted upon from below, in order to cool the base of this container. In this way, a stressing of the container is carried out, in particular in a transfer region between the blow moulding machine and the filling device. In this case the cooling of the base should preferably be integrated in an already existing transfer region between a blow moulding machine and the filling device.

In the case of a further advantageous embodiment the shaping device also has a clean room, inside which the containers are capable of being conveyed during the shaping thereof and which is bounded off from the environment by means of a further sealing device. With this method therefore the containers are already blow moulded out of the plastics material pre-forms under sterile conditions and the base thereof is subsequently cooled.

In the case of a further advantageous embodiment at least one sealing device has a continuous duct capable of being filled with a liquid, and a line is provided by way of which liquid is capable of being supplied from this duct or liquid supplied to this duct is capable of being supplied to the container for the cooling thereof.

It is therefore advantageous for the cooling medium used for the subsequent cooling of the base of the containers to be the same medium which is also used for filling this hydraulic sealing or the duct of the rotating parts of the filling means or closing means respectively and/or the blow moulding machine. The advantage of this procedure is that the aforesaid medium is already present in these plants and can be produced in various ways. It is advantageous for this medium to be sterile water which in a particularly preferred manner is mixed with a sterilization agent, and in particular an oxidative sterilization agent.

It is advantageous for the apparatus to have a production device for producing this sterile water. This can be for example a sterile water filtration device or even a thermal plant (UHT process). The sterilization agent used can be for example $H_2O_2$, preferably in a concentration of from 2% to 5%. In addition, it would be possible for peracetic acid to be used (preferably in a concentration of between 500 ppm and 2000 ppm).

In addition, other sterilization agents are also possible.

In this way, in the case of a further advantageous embodiment the same liquid as is also used for the sealing is used for the aforesaid cooling device.

In the case of a further advantageous embodiment the apparatus has a cooling device for cooling the liquid supplied to the containers for the cooling thereof. In this case it is advantageously possible for this sterile cooling medium to be kept at low temperatures by way of a cooler for the subsequent cooling of the containers or for the cooling of the base respectively. It is advantageous in this case for temperatures of between 1° and 30°, preferably of between 2° and 25°, particularly preferred of between 3° and 20°, and in a particularly preferred manner of between 3° and 15°, to be used. It is also advantageous for a cooling circuit to be provided, inside which the liquid medium used for the cooling circulates.

In this case it is possible for the cooling device to be supplied with substances such as for example glycol. These substances can also originate in this case from the shaping device. In addition, it is possible for the cooling medium for the subsequent cooling of the containers to be drained off at least in part at specified intervals of time and to be filled fresh again in order to be able to keep the concentration of sterilization agent in the sterile water constant.

It is advantageous for this cooling circuit also to have a collecting device, by means of which for example medium dripping off from the containers again can be collected.

It is advantageous for the sealing devices mentioned above to be so-called surge chambers which in each continuous duct also have a blade which is movable with respect to the duct and which dips into the sealing liquid. It is advantageous for the aforesaid continuous duct to be made stationary.

Furthermore, pumps can advantageously be provided which operate the aforesaid cooling circuit. In addition, a pumping device can also be provided which conveys the liquid from the sealing devices to the aforesaid cooling circuit. Valves can also be provided, such as for example non-return valves, which prevent a return flow of the sterile medium into the sealing devices, or even valves which—depending upon the filling states of the sealing devices and also of the cooling circuit—cause the supply and removal of the sterile cooling medium accordingly.

In this way, a subsequent cooling of a container in a sterile region is proposed for the first time. It is therefore advantageous for a clean room also to be provided in that region in which the container is conveyed from the shaping device to the filling device. In this case it is advantageous, as mentioned above, for the cooling medium from existing systems to be used for filling surge chambers. In this way, it can be possible for no additional mixing of water and chemicals to be necessary and, in this way, for the system to be capable of being kept simple.

As a result of implementing this subsequent cooling of the base it is also possible for aseptic plants to be produced for carbonated products, in particular also in a block design.

In this way, no additional structural space is required and the plant equipped in this way remains compact. On account of the short paths used there is also a low risk of re-contamination. In addition, since sterile water and sterilization agent are used for the cooling water, it is also possible to dispense with a cleaning of the conveying system for the subsequent cooling of the containers with lye or acid. Further advantages and embodiments are evident from the accompanying drawings.

In the drawings

FIG. 1 is a diagrammatic illustration of an apparatus according to the invention;

FIG. 2 is an illustration of a sealing device in the manner of a surge chamber.

Figure 3:
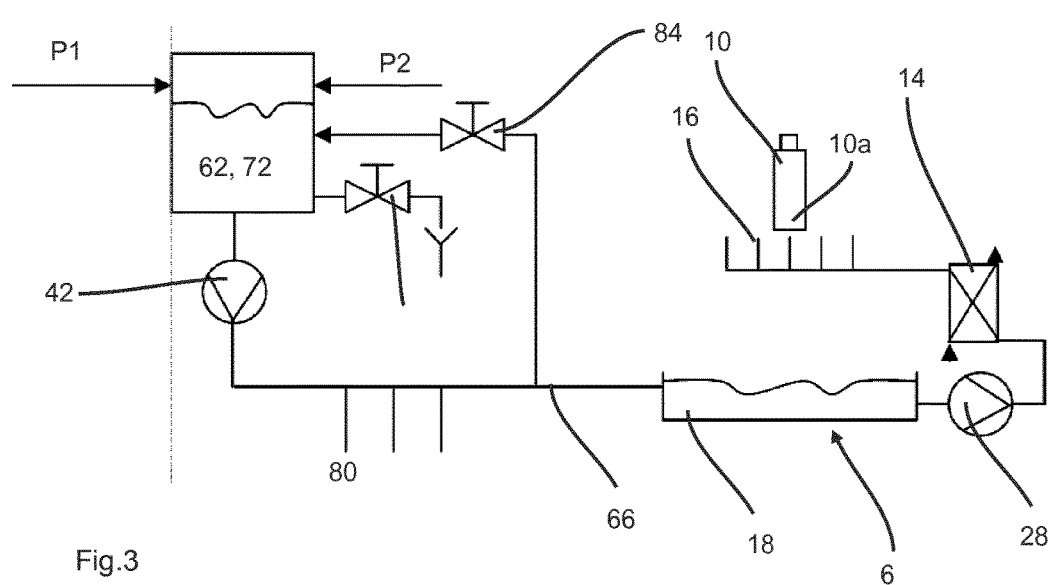
FIG. 3 is an illustration to explain the additional cooling of the containers.

FIG. 1 is a diagrammatic illustration of an apparatus 1 according to the invention for the production of beverage containers. In this case a heating device 32 is provided, such as in particular an infrared furnace, which heats supplied plastics material pre-forms (not shown). After that, the plastics material pre-forms heated in this way are supplied by way of a supply device, such as a supply star wheel 34, to the shaping device 2 which is designated with 2 in its entirety. In this shaping device 2 the plastics material pre-forms are shaped into the plastics material containers and are removed by way of a removal device, such as a removal star wheel 36.

After that, the containers are cooled by a cooling device 6 (shown only diagrammatically), in particular in the internal region of the base thereof, and, after that, they are transferred to a filling device 4. The reference letter P designates the conveying path of the containers through the plant. The reference number 20 designates roughly diagrammatically a clean room, inside which the containers are filled. The reference number 12 likewise designates a clean room, inside which the containers are shaped. The cooling device 6 also has a corresponding clean room through which the containers are conveyed.

In addition, a conveying device is provided which conveys the containers from the shaping device 2 to the filling device 4. This conveying device preferably has at least one conveying star wheel, and preferably several conveying star wheels. In the case of the embodiment illustrated in FIG. 1, two conveying star wheels 37, 39 are visible. The cooling device 6 can also have a conveying star wheel (not shown) which conveys containers along a circular conveying path during their cooling. In addition, the filling device can also have a conveying star wheel on which the containers are conveyed during the filling thereof. The shaping device can also have a rotatable carrier, such as for example a blow moulding wheel, by means of which the plastics material containers are conveyed during the shaping procedure thereof.

FIG. 2 is a diagrammatic illustration of sealing devices 62 and 72, as may be used for the filling device (reference number 62) and the shaping device 2 (reference number 72). In a corresponding manner the reference numbers 2 and 4 also refer to these two parts of the plant. In this case the sealing devices or sealing-off devices 62, 72 respectively have the ducts 62a, 62b, 72a, 72b in each case, in which a sterile medium F is conveyed. The reference numbers 64 and 74 refer to blades which dip into this liquid. Here these blades are arranged on a carrier 65 rotatable about a pre-set axis of rotation (not shown) in this case. The ducts 62a, 62b, 72a and 72b are at rest.

The reference number 80 refers to a supply line which supplies a sterile medium, i.e. the liquid F, to the ducts 62a, 62b, 72a, 72b. In this case valves 84, 86 can be provided which are used for the regulation of a filling state of the liquid inside the continuous ducts 62a, 62b, 72a, 72b. The liquid can be supplied to the ducts by way of a connecting line 82.

The ducts have arranged between them the respective clean rooms 12, 20, in which the containers are conveyed and are also treated in this case, thus shaped or filled respectively here. The reference number 65 refers to a carrier on which the two blades 64, 74 are arranged in this case. This carrier, which is rotatable in this case, also forms a boundary of the clean room. The liquid passes into the respective ducts 62a, 72a, 62b, 72b by way of a line portion attached to the valve 84 or 86 respectively.

FIG. 3 is diagrammatic illustration for the visualization of the apparatus according to the invention. In this case too, the supply device 80 is again illustrated which supplies the ducts 62a, 62b, 72a, 72b with the sterile medium. As shown by the arrow P1, sterile water can be supplied to the ducts in this case and, as shown by the arrow P2, in addition a sterilization medium, as shown above. A refilling of the ducts can be carried out by way of the valve 84. At the same time a connecting line 66 is provided which supplies the cooling device designated with 6 in its entirety. This cooling device 6 likewise has a pump 28 which is used for supplying stressing devices 16 which, in particular, act upon or spray respectively a base area 10a of the containers 10 with the liquid medium.

In addition, a cooling element 14 is provided which cools this liquid medium for acting upon the containers. Medium dripping off from the containers 10 can be collected in part by a collecting container 18 and can be re-used. In this way, the cooling device 6 is also designed in the form of a circuit in this case. In order to prevent the cooling medium from decreasing, the latter can be filled up again by way of the supply line 66. In addition, a pump 42 can be provided which conveys the sterile medium from the ducts 62a, 62b, 72a, 72b to the cooling device 6.

The Applicants reserve the right to claim all the features disclosed in the application documents as being essential to the invention, insofar as they are novel either individually or in combination as compared with the prior art.

LIST OF REFERENCES 1 apparatus
2 shaping device 4 filling device
6 cooling device
10 containers
10a base area
12 clean room
14 cooling element
16 stressing device
18 collecting container
20 clean room
28 pump
32 heating device
34 supply star wheel
36 removal star wheel
37, 38 conveying star wheels
62, 72 seals, sealing devices
62a, 62b ducts
72a, 72b ducts
64, 74 blades
65 carrier
66 connecting line
80 supply line
82 connecting line
84, 86 valves
P conveying path
F sterile medium/liquid
P1 arrow—supply of sterile water
P2 arrow—supply of a sterile medium

The invention claimed is:

1. A method of producing containers (10) filled with liquid, wherein plastics material pre-forms are shaped to form plastics material containers (10) by a shaping device (2), these plastics material containers are conveyed to a filling device (4) and are filled with a liquid by the filling device, wherein the containers (10) are cooled on their conveying path between the shaping device (2) and the filling device (4) at least in sections by being acted upon with a liquid medium, wherein the containers are conveyed at least during the filling inside a clean room (20) which is bounded off from an environment by a sealing device (62), and wherein at least one clean room (12, 20) is sealed off by the use of a sterile liquid conveyed in a continuous duct (62a, 62b, 72a, 72b), and the liquid from this duct (62a, 62b, 72a, 72b) is also used in order to cool the containers.

2. The method according to claim 1, wherein the containers are acted upon with a sterile liquid medium in order to cool them.

3. The method according to claim 2, wherein the containers are also conveyed inside a clean room (12) during their shaping procedure in the shaping device (2).

4. The method according to claim 1, wherein the liquid used for cooling the containers (10) is conveyed in a liquid circuit.

5. The method according to claim 4, wherein the liquid medium drips off into a collecting container and being returned.

6. The method according to claim 1, wherein the liquid used for cooling the containers (10) is itself cooled.

7. The method according to claim 5, wherein a cooling unit which cools the liquid is provided in the cooling circuit.

8. The method according to claim 1, wherein the liquid to be filled into the containers (10) is a $CO_2$-containing beverage.

9. The method according to claim 1, wherein a base area of the containers (10) is acted upon with the liquid medium.

10. The method according to claim 9, wherein stressing devices are provided which apply the liquid medium to the base area of the containers (10).

11. The method according to claim 10, wherein the stressing devices are nozzles.

12. The method according to claim 1, wherein the liquid which is used to seal off at least one clean room (20) and for the cooling liquid for the containers (10) to originate from the same source.

13. The method according to claim 12, wherein at least for a time a flow connection is present between the sealing device (62) for sealing off at least one clean room (20) and the cooling device.

14. The method according to claim 1, wherein the liquid medium is sterile water which is mixed with an oxidative sterilization agent and which is produced with a production device.

15. An apparatus (1) for the production of containers (10) filled with liquid, with a shaping device (2) which shapes plastics material pre-forms into plastics material containers (10) by acting upon them with a gaseous medium, with a filling device (4) which is arranged in a conveying direction of the plastics material pre-forms downstream with respect to the shaping device (2) and which fills the plastics material containers (10) with a liquid, and with a cooling device (6) which is arranged between the shaping device (2) and the filling device (4) and which acts upon the plastics material containers (10) with a liquid medium at least in sections in order to cool them, wherein at least the filling device (4) has a clean room (20), inside which the containers are capable of being conveyed during the filling thereof and which is bounded off from an environment by at least one sealing device (60), and wherein at least one sealing device (60, 70) has a continuous duct (62a, 62b, 72a, 72b) capable of being filled with a liquid, and a line (66) is provided by way of which liquid is capable of being supplied from this duct (62a, 62b, 72a, 72b) to the container (10) for the cooling thereof.

16. The apparatus (1) according to claim 15, wherein the shaping device (2) has a clean room (12), inside which the containers are capable of being conveyed during the shaping thereof and which is bounded off from the environment by at least one further sealing device (70).

17. The apparatus (1) according to claim 15, wherein the apparatus (1) has a cooling device (14) for cooling the liquid supplied to the containers for the cooling thereof.

18. The apparatus (1) according to claim 15, wherein the cooling medium used for the cooling of a base of the containers (10) is the same medium which is also used for filling the duct of the rotating parts of the filling machine, the closing machine and/or the blow moulding machine.

* * * * *